(12) United States Patent
Dellock et al.

(10) Patent No.: US 9,994,144 B2
(45) Date of Patent: Jun. 12, 2018

(54) ILLUMINATED AUTOMOTIVE GLAZINGS

(71) Applicant: Ford Global Technologies, LLC, Dearborn, MI (US)

(72) Inventors: Paul Kenneth Dellock, Northville, MI (US); Stuart C. Salter, White Lake, MI (US); Tom Boettger, Dearborn, MI (US); Jim Pizzimenti, Carleton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 77 days.

(21) Appl. No.: 15/162,155

(22) Filed: May 23, 2016

(65) Prior Publication Data

US 2017/0334342 A1   Nov. 23, 2017

(51) Int. Cl.
| | |
|---|---|
| *B60Q 1/26* | (2006.01) |
| *B60Q 1/24* | (2006.01) |
| *F21V 9/16* | (2006.01) |
| *F21V 7/22* | (2018.01) |
| *B60Q 3/00* | (2017.01) |
| *B60J 1/02* | (2006.01) |
| *B62D 25/04* | (2006.01) |
| *B60R 13/00* | (2006.01) |
| *F21Y 101/02* | (2006.01) |
| *F21Y 105/00* | (2016.01) |

(52) U.S. Cl.
CPC ............... *B60Q 1/24* (2013.01); *B60J 1/02* (2013.01); *B60Q 3/002* (2013.01); *B60R 13/00* (2013.01); *B62D 25/04* (2013.01); *F21V 7/22* (2013.01); *F21V 9/16* (2013.01); *F21V 9/30* (2018.02); *F21Y 2101/02* (2013.01); *F21Y 2105/001* (2013.01)

(58) Field of Classification Search
CPC .......... B60Q 1/24; B60Q 1/26; B60Q 1/2619; B60Q 1/2661; B60Q 1/268; B60Q 1/2696; B60Q 1/28; B60Q 1/30; B60Q 1/302; B60Q 3/208; B60Q 3/602–3/68; B60J 1/02; B60R 13/00; B62D 25/04; F21V 7/22
USPC ................... 362/503–504, 509–511
See application file for complete search history.

(56) References Cited

U.S. PATENT DOCUMENTS

| | | |
|---|---|---|
| 2,486,859 A | 11/1949 | Meijer et al. |
| 5,053,930 A | 10/1991 | Benavides |
| 5,434,013 A | 7/1995 | Fernandez |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,419,854 B1 | 7/2002 | Yocom et al. |
| 6,494,490 B1 | 12/2002 | Trantoul |
| 6,577,073 B2 | 6/2003 | Shimizu et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Jason Rogers; Price Heneveld LLP

(57) ABSTRACT

A vehicle is provided that includes a glazing that has a first glass substrate and a second glass substrate. A polymeric interlayer is positioned between the first and second glass substrates and a phosphorescent layer is positioned on the polymeric interlayer. A light source is optically coupled with polymeric interlayer.

12 Claims, 9 Drawing Sheets

(56) References Cited

U.S. PATENT DOCUMENTS

| | | |
|---|---|---|
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,828,043 B2 | 12/2004 | Sturley |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,568,659 B2 | 2/2017 | Verger et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0253486 A1 | 9/2015 | Verger et al. |
| 2015/0267881 A1 | 9/2015 | Salter et al. |
| 2015/0308659 A1 | 10/2015 | Clabau et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 0522785 A2 | 11/1993 |
| EP | 1793261 A1 | 6/2007 |
| EP | 2110237 A1 | 10/2009 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014065650 A1 | 5/2014 |
| WO | 2014068440 A1 | 5/2014 |
| WO | 2014161927 A1 | 10/2014 |

ILLUMINATED AUTOMOTIVE GLAZINGS

FIELD OF THE INVENTION

The present disclosure generally relates to vehicle lighting systems, and more particularly, to lighting systems for automotive glazings.

BACKGROUND OF THE INVENTION

Illumination systems used in vehicles may offer a unique and attractive viewing experience. It is therefore desired to incorporate such illumination systems in portions of vehicles to provide accent and functional lighting.

SUMMARY OF THE INVENTION

According to one aspect of the present invention, a vehicle is provided that includes a glazing that has a first glass substrate and a second glass substrate. A polymeric interlayer is positioned between the first and second glass substrates and a phosphorescent layer is positioned on the polymeric interlayer. A light source is optically coupled with the polymeric interlayer.

According to another aspect of the present invention, an automotive glazing is provided that includes a first substantially transparent substrate, a second substantially transparent substrate and an interlayer positioned between the first and second substrates. A light source is positioned between the interlayer and one of the first and second substrates and a phosphorescent layer is positioned between the light source and the interlayer.

According to yet another aspect of the present invention, a vehicle is provided that includes a body defining a cabin and a windscreen with an exterior substantially transparent substrate, and an interior substantially transparent substrate. A light source extends between the exterior and interior substantially transparent substrates. The light source is configured to emit light into the cabin and exterior to the vehicle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the invention will be set forth in the detailed description which follows and will be apparent to those skilled in the art from the description or recognized by practicing the invention as described in the following description together with the claims and appended drawings.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 1:
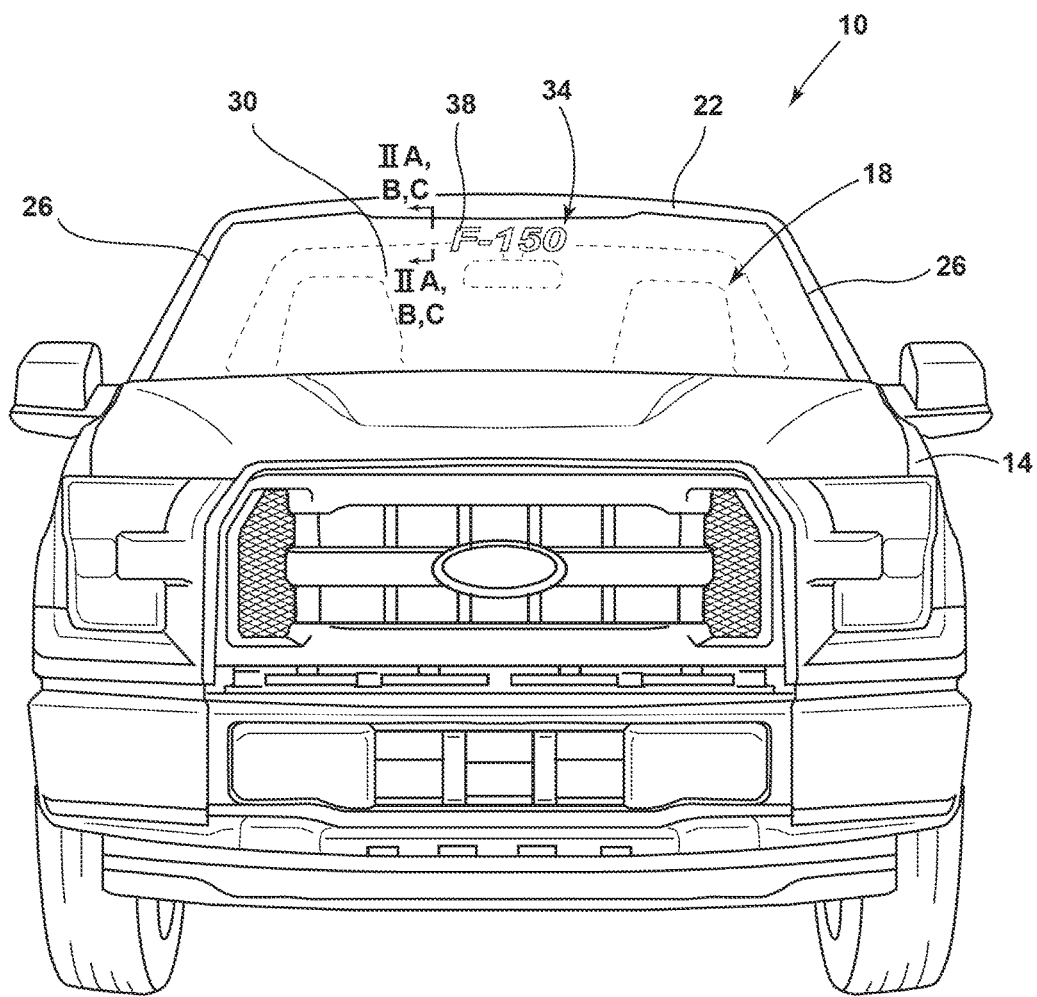
FIG. 1 is front elevational view of a vehicle having a windscreen, according to one embodiment.

Referring now to FIG. 1, reference numeral 10 generally designates a vehicle having a body 14 defining a cabin 18. The body 14 further defines a roof 22 and a pair of A-pillars 26. Positioned between the A-pillars 26 and below the roof 22 is a windscreen 30 or automotive glazing. In the depicted embodiment, the windscreen 30 includes a decoration 34 positioned along a top portion of the windscreen 30. It will be understood that the decoration 34 may be positioned anywhere on the windscreen 30 and/or on other automotive glazings (e.g., driver/passenger windows, quarter windows and/or rear windows) of the vehicle 10. The decoration 34 may offer an owner of the vehicle 10 an option to personalize and/or aesthetically enhance the appearance of the vehicle 10. The decoration 34 may define at least one indicium 38. The indicium 38 may include alphanumeric text, numbers, symbols, logos, pictures, or other aesthetically pleasing designs. According to various embodiments, the decoration 34 and/or the indicium 38 may be configured to glow, luminesce or otherwise emit light out of the windscreen 30 to an exterior of the vehicle 10, as explained in greater detail below.

Figure 2A:
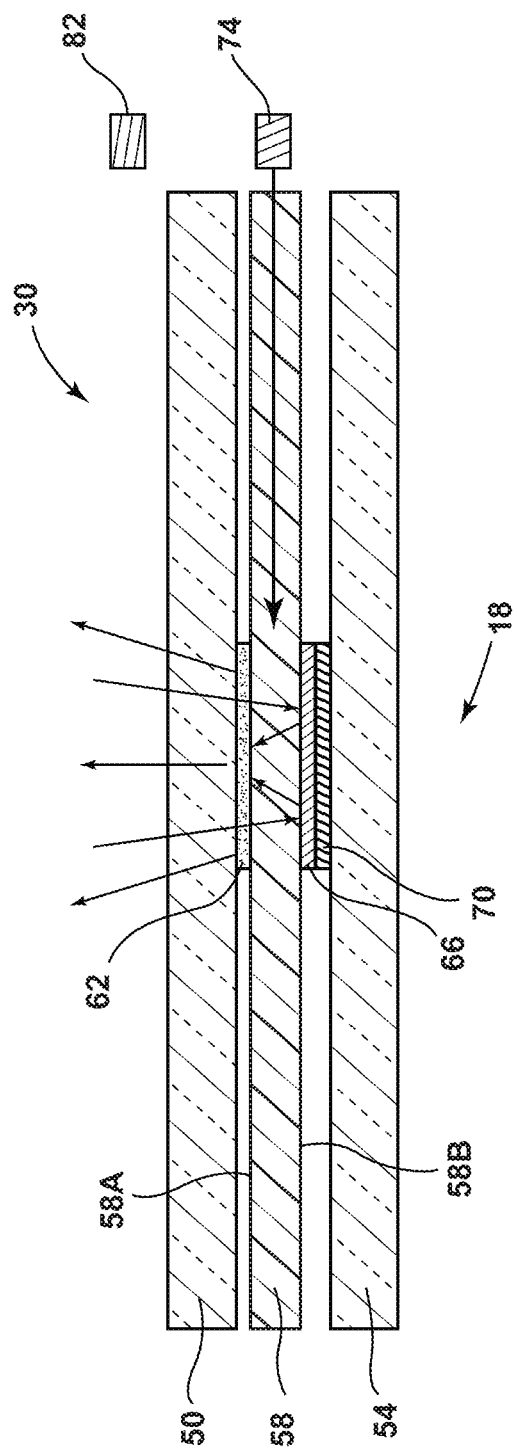
FIG. 2A is a cross-sectional view of the windscreen taken at line IIA of FIG. 1, according to one embodiment.

Referring now to FIG. 2A, the windscreen 30 is a multi-layer structure including a first, or exterior, substantially transparent substrate 50, a second, or interior, substantially transparent substrate 54, and an interlayer 58 positioned between the first and second substantially transparent substrates 50, 54. The first and second substantially transparent substrates 50, 54 may include a substantially transparent material, such as glass and/or a polymeric material (e.g., acrylic, polycarbonate, high density polyethylene, etc.). As explained above, the first substantially transparent substrate 50 may be disposed on an exterior side of the windscreen 30 and the second substantially transparent substrate 54 may be disposed on an interior side of the windscreen 30, such that the second substrate 54 is in contact with the cabin 18 of the vehicle 10 (FIG. 1). The interlayer 58 may include a substantially transparent material such as glass, a polymer (e.g., polyvinyl butyral or ethylene vinyl acetate), etc. The interlayer 58 may be sandwiched between the first and second substantially transparent substrates 50, 54 such that the windscreen 30 is formed of a safety glass. The interlayer 58 defines an exterior surface 58A and an interior surface 58B. Positioned on the exterior surface 58A of the interlayer 58 is a phosphorescent layer 62 and positioned on the interior surface 58B is a reflector layer 66 and a first concealment layer 70. Optically coupled with the interlayer 58 is a light source 74.

The reflector layer 66 is configured to reflect light entering the interlayer 58 toward the phosphorescent layer 62. The reflector layer 66 may include reflective materials such as a high luster metal, a vacuum metalized component, a white pigment (e.g., titanium dioxide), or other structures configured to reflect light. The reflector layer 66 may be positioned behind the phosphorescent layer 62 and/or extend outwardly from behind the phosphorescent layer 62. Positioned on the reflector layer 66, in between the second substantially transparent substrate 54 and the reflector layer 66, is the first concealment layer 70. The first concealment layer 70 is configured to conceal the reflector layer 66 from an occupant within the cabin 18 of the vehicle 10 (FIG. 1). The first concealment layer 70 may include an opaque ink (e.g., a black ink or other solid color), an opaque substrate or a film configured to occlude light. The light source 74 may include a light-emitting diode, an incandescent bulb, or other light emission structure configured to emit light into the interlayer 58. The emitted light may be of an ultraviolet and or blue wavelength (e.g., about 350 nm to about 490 nm). The light source 74 may be positioned proximate the windscreen 30 such that the emitted light enters and travels through the interlayer 58 (i.e., the interlayer 58 functions as a light guide for the light source 74). For example, the light source 74 may be positioned in one or both of the A-pillars 26, the roof 22, a headliner of the vehicle 10, or other locations around the windscreen 30. The interlayer 58 is configured to function as a light pipe and carry the light from the light source 74 to the phosphorescent layer 62. The interlayer 58 may include a plurality of scattering sites or structures positioned within the interlayer 58 proximate the phosphorescent layer 62 such that light from the light source 74 is scattered to the phosphorescent layer 62 and/or the reflector layer 66. The light from the light source 74 is of such a wavelength that it is configured to activate the phosphorescent layer 62, as explained in greater detail below.

Still referring to FIG. 2A, the phosphorescent layer 62 may be prepared by dispersing one or more persistent phosphorescent materials in a polymer matrix to form a homogenous mixture using a variety of methods. For example, the phosphorescent layer 62 may be rendered by dispersing the phosphorescent materials into a solid state solution (homogenous mixture in a dry state) that may be incorporated in a polymer matrix formed by extrusion, injection molding, compression molding, calendaring, thermoforming, etc. Additionally or alternatively, a phosphorescent structure may be disposed on the exterior surface 58A of the interlayer 58 which may incorporate the phosphorescent materials and be applied by painting, screen printing, flexography, spraying, slot coating, dip coating, roller coating, bar coating, and/or any other methods known in the art. Further, it will be understood that the phosphorescent layer 62 may be positioned on a vehicle exterior side of the first substrate 50.

The persistent phosphorescent materials may be defined as being able to store an activation emission and release light gradually (i.e., a perceptible glow), for a period of several minutes or hours, once the activation emission is no longer present. The decay time may be defined as the time between the end of excitation from the activation emission and the moment when the light intensity of the phosphorescent structure drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

The persistent phosphorescent material, according to one embodiment, may be operable to emit light at or above an intensity of 0.32 mcd/m$^2$ after a period of 10 minutes. Additionally, the persistent phosphorescent material may be operable to emit light above or at an intensity of 0.32 mcd/m$^2$ after a period greater than 30 minutes, greater than 60 minutes, greater than 2 hours, greater than 5 hours, greater than 10 hours or greater than 24 hours. Accordingly, the persistent phosphorescent material may continually illuminate in response to excitation through a plurality of excitation sources emitting an activation emission, including, but not limited to, ambient light (e.g., the sun), light reflected from the reflector layer 66, light from the light source 74, other light sources as described in greater detail below and/or light sources located within the cabin 18 of vehicle 10. The periodic absorption of the activation emission from the excitation sources may provide for a substantially sustained charge of the persistent phosphorescent materials to provide for a consistent passive illumination. For example, the light source 74 may be pulsed, or otherwise periodically be activated to charge the phosphorescent materials such that the phosphorescent layer 62 provides a constant or changing level of emitted phosphorescent light. In some embodiments, a light sensor 82 may be provided proximate the phosphorescent layer 62 to monitor the light illumination intensity of the phosphorescent material and initiate an excitation source (e.g., light from the light source 74) when the illumination intensity falls below 0.32 mcd/m$^2$, or any other predefined intensity level.

In examples where the light source 74 is configured to charge the phosphorescent materials, the light source 74 may incorporate one or more blue, ultraviolet or high blue content (e.g., where greater than about 10%, 20%, 30%, 40%, 50%, 60%, 70%, 80% or 90% of the emitted light is blue) light sources (e.g., light bulb and/or light emitting diode).

The persistent phosphorescent materials may correspond to alkaline earth aluminates and silicates, for example, doped di-silicates, or any other compound that is capable of emitting light for a period of time once an activation emission is no longer present. The persistent phosphorescent materials may be doped with one or more ions, which may correspond to rare earth elements, for example, Eu2+, Tb3+ and Dy3+. The polymeric material of the phosphorescent layer 62 may include between about 0.1% to about 25.0% of the persistent phosphorescent material either by weight or mole fraction. In embodiments utilizing the phosphorescent material on exterior surface 58A of the interlayer 58 in FIG. 2A, the exterior surface 58A may have the phosphorescent material applied in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation. It will be understood that the phosphorescent materials may be incorporated into the interlayer 58 without departing from the teachings provided herein.

The phosphorescent material, according to one embodiment, may be a translucent white color when unilluminated. Once the phosphorescent material receives the activation emission of a particular wavelength, the phosphorescent material may emit white light, blue light, red light, green light or combinations thereof therefrom. The light emitted from the phosphorescent material, and, thereby, the indicium 38 (FIG. 1), may have sufficient brightness such that the decoration 34 is visible (e.g., in the day and/or at night). According to one embodiment, the blue emitting phosphorescent material may be $Li_2ZnGeO_4$ and may be prepared by a high temperature solid-state reaction method or through any other practicable method and/or process. The blue afterglow may last for a duration of two to eight hours and may originate from an activation emission and d-d transitions of $Mn^{2+}$ ions.

According to an alternate exemplary embodiment, 100 parts of a commercial solvent-borne polyurethane, such as Mace resin 107-268, having 50% solids polyurethane in Toluene/Isopropanol, 125 parts of a blue green long persistent phosphor, such as Performance Indicator PI-BG20, and 12.5 parts of a dye solution containing 0.1% Lumogen Yellow F083 in dioxolane, may be blended to yield a low rare earth mineral phosphorescent structure or be used in the phosphorescent layer 62 of FIG. 2A. It will be understood that the compositions provided herein are non-limiting examples. Thus, any phosphor known in the art may be utilized as a phosphorescent material or structure without departing from the teachings provided herein. Moreover, it is contemplated that any long persistent phosphor known in the art may also be utilized without departing from the teachings provided herein.

Additional information regarding the production of long persistence luminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," issued Apr. 24, 2012, the entire disclosure of which is incorporated herein by reference. For additional information regarding long persistent phosphorescent structures, refer to U.S. Pat. No. 6,953,536 to Yen et al., entitled "LONG PERSISTENT PHOSPHORS AND PERSISTENT ENERGY TRANSFER TECHNIQUE," issued Oct. 11, 2005; U.S. Pat. No. 6,117,362 to Yen et al., entitled "LONG-PERSISTENCE BLUE PHOSPHORS," issued Sep. 12, 2000; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," issued Feb. 10, 2015, all of which are incorporated herein by reference in their entirety.

Additionally or alternatively, the phosphorescent layer 62 of FIG. 2A may be mixed with or include a structure including one or more photoluminescent materials. Such photoluminescent materials may have energy converting elements with phosphorescent or fluorescent properties. For example, the photoluminescent material may include organic or inorganic fluorescent dyes including rylenes, xanthenes, porphyrins, and phthalocyanines, or combinations thereof. Additionally or alternatively, the photoluminescent material may include phosphors from the group of Ce-doped garnets such as YAG:Ce. The photoluminescent material may be formulated to have a Stokes shift resulting in the conversion of visible or non-visible light into visible light having an emission spectrum expressed in a desired color, which may vary per lighting application. Such photoluminescent material may have a limited persistence (e.g., less than about 10 minutes, less than about 5 minutes, less than about 1 minute or no human perceivable persistence).

Figure 2B:
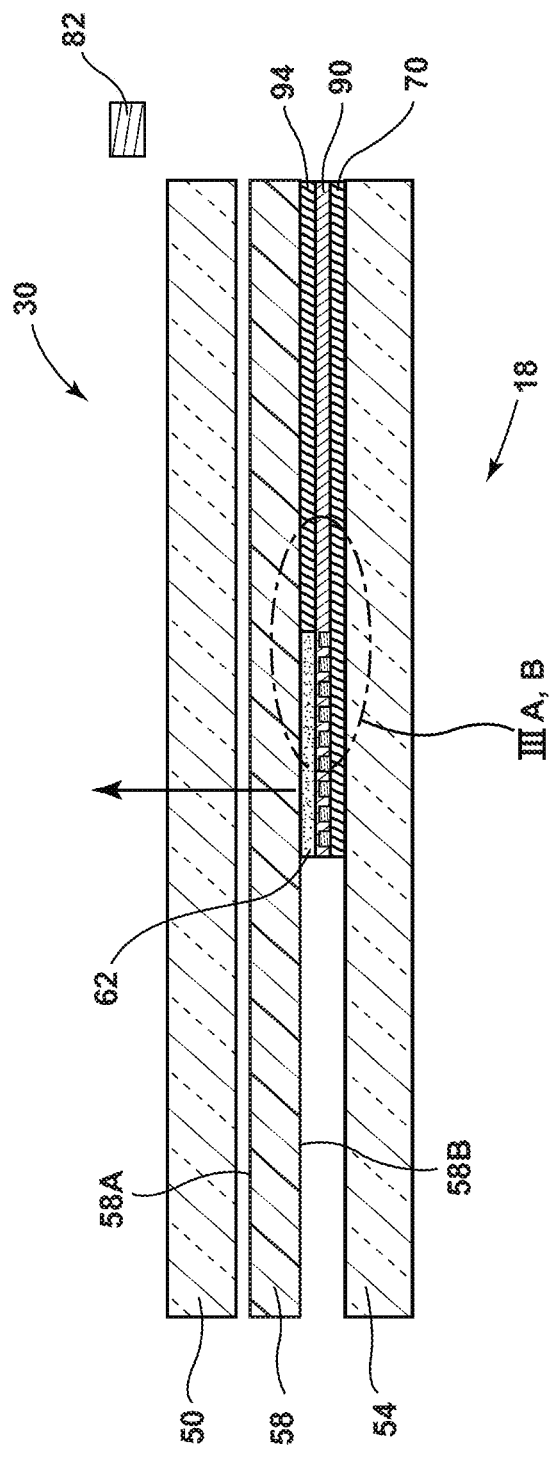
FIG. 2B is a cross-sectional view of the windscreen taken at line IIB of FIG. 1, according to another embodiment.

Referring now to the depicted embodiment of FIG. 2B, the windscreen 30 may include a light assembly 90 positioned between the interlayer 58 and the second substrate 54. The light assembly 90 may extend across a portion of the interlayer 58. In the depicted embodiment, the phosphorescent layer 62 is positioned on the light assembly 90. Further, the light assembly 90 includes the first concealment layer 70 and a second concealment layer 94. The second concealment layer 94 may be substantially similar to that as the first concealment layer 70. The phosphorescent layer 62 and the second concealment layer 94 may cooperate to define the indicium 38 (i.e., the phosphorescent layer 62 may define the indicium 38 (FIG. 1), with the second concealment layer 94 filling in the remainder of the decoration 34 (FIG. 1)). Although depicted between the interlayer 58 and the second substrate 54, it will be understood that the light assembly 90 may be positioned between the interlayer 58 and the first substrate 50 without departing from the teachings provided herein. The light assembly 90 is configured to emit light of a wavelength which will activate the phosphorescent layer 62. The light assembly 90 may extend to an edge or end of the windscreen 30, or may be coupled to a power source through at least one transparent conductive lead (e.g., such as indium tin oxide and/or nanowire mesh).

Figure 2C:
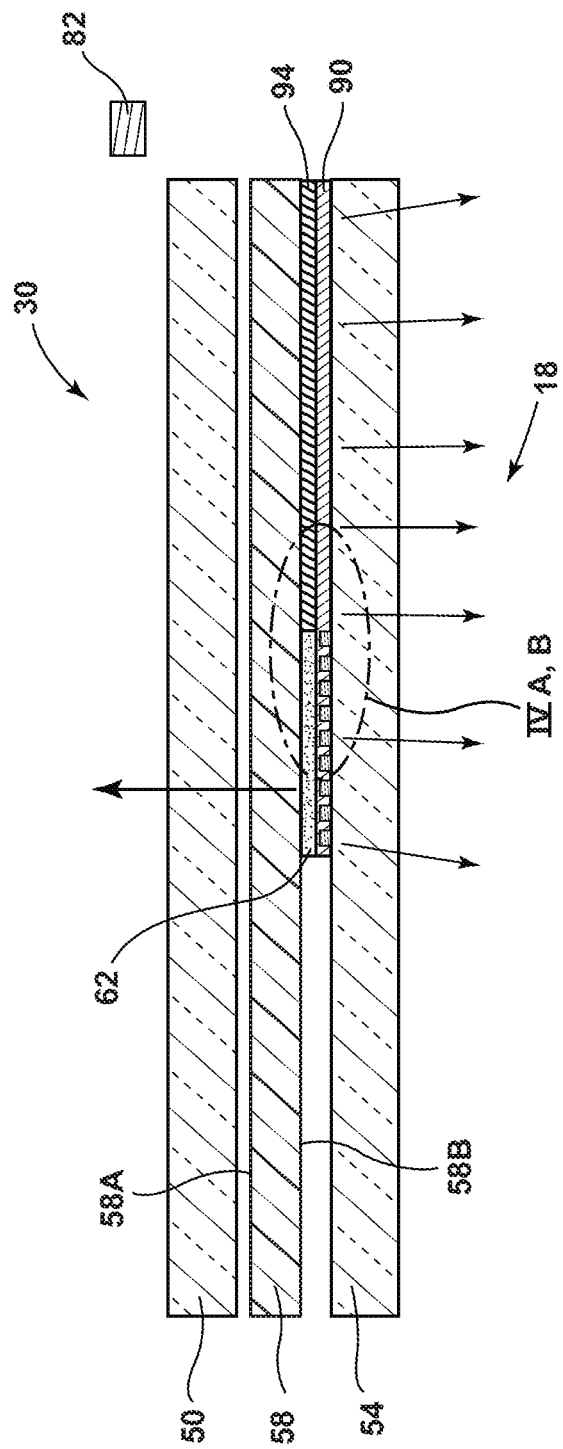
FIG. 2C is a cross-sectional view of the windscreen taken at line IIC of FIG. 1, according to yet another embodiment.

Referring now to the depicted embodiment of FIG. 2C, the light assembly 90 may be configured to direct light in two or more directions. In the depicted embodiment, the light assembly 90 is configured to emit light toward an exterior of the vehicle 10 (FIG. 1) (e.g., the phosphorescent layer 62 and/or first substrate 50) and toward the cabin 18 of the vehicle 10. In such an embodiment, the light directed into the cabin 18 from the light assembly 90 may function as a dome light for the vehicle 10. It will be understood that the decoration 34, as depicted, may equally be applied to the opposite side of the interlayer 58 without departing from the teachings provided herein.

Figure 3A:
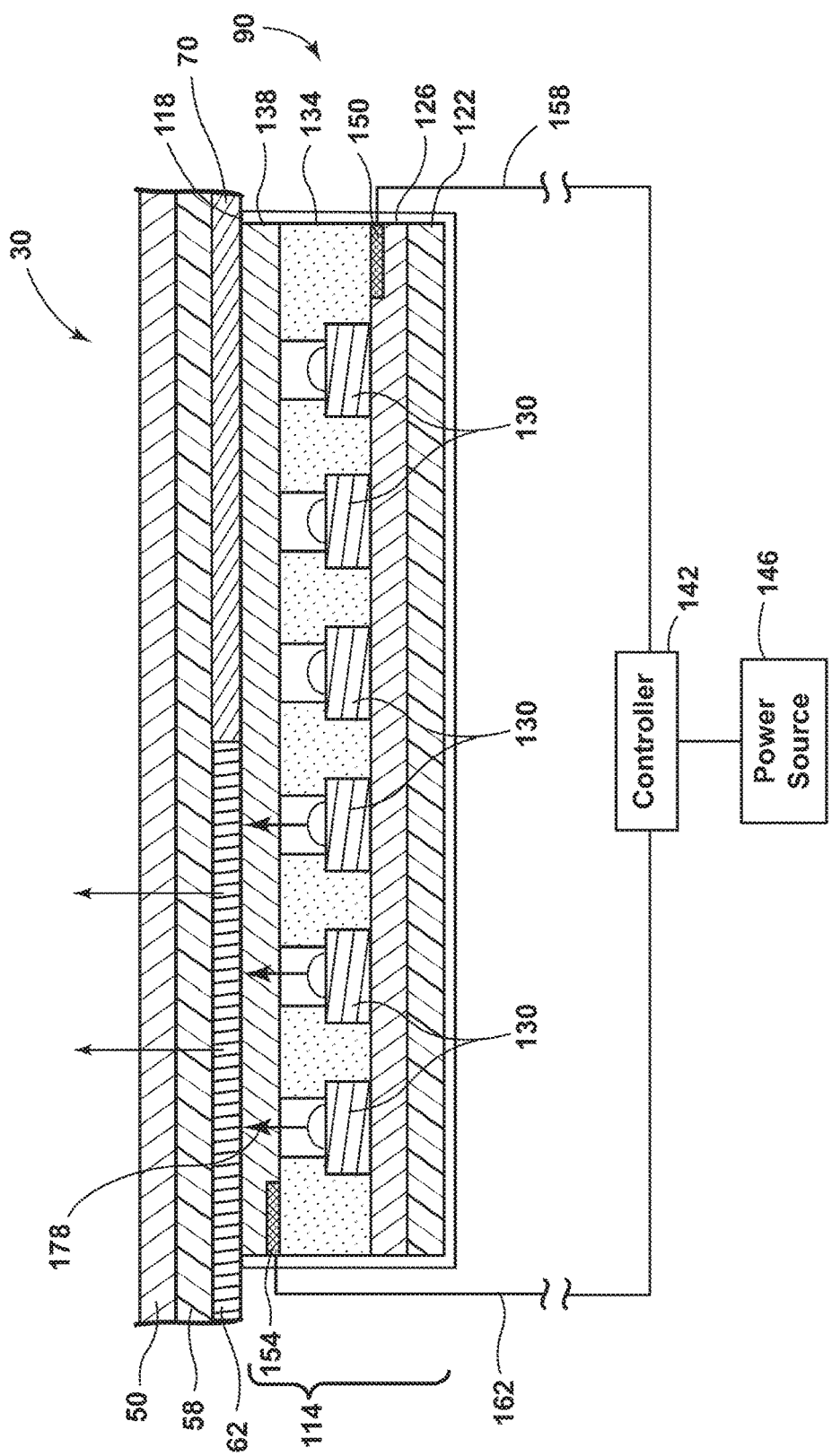
FIG. 3A is an enhanced view of the windscreen taken at line IIIA of FIG. 2B illustrating a light assembly according to one embodiment.
Figure 3B:
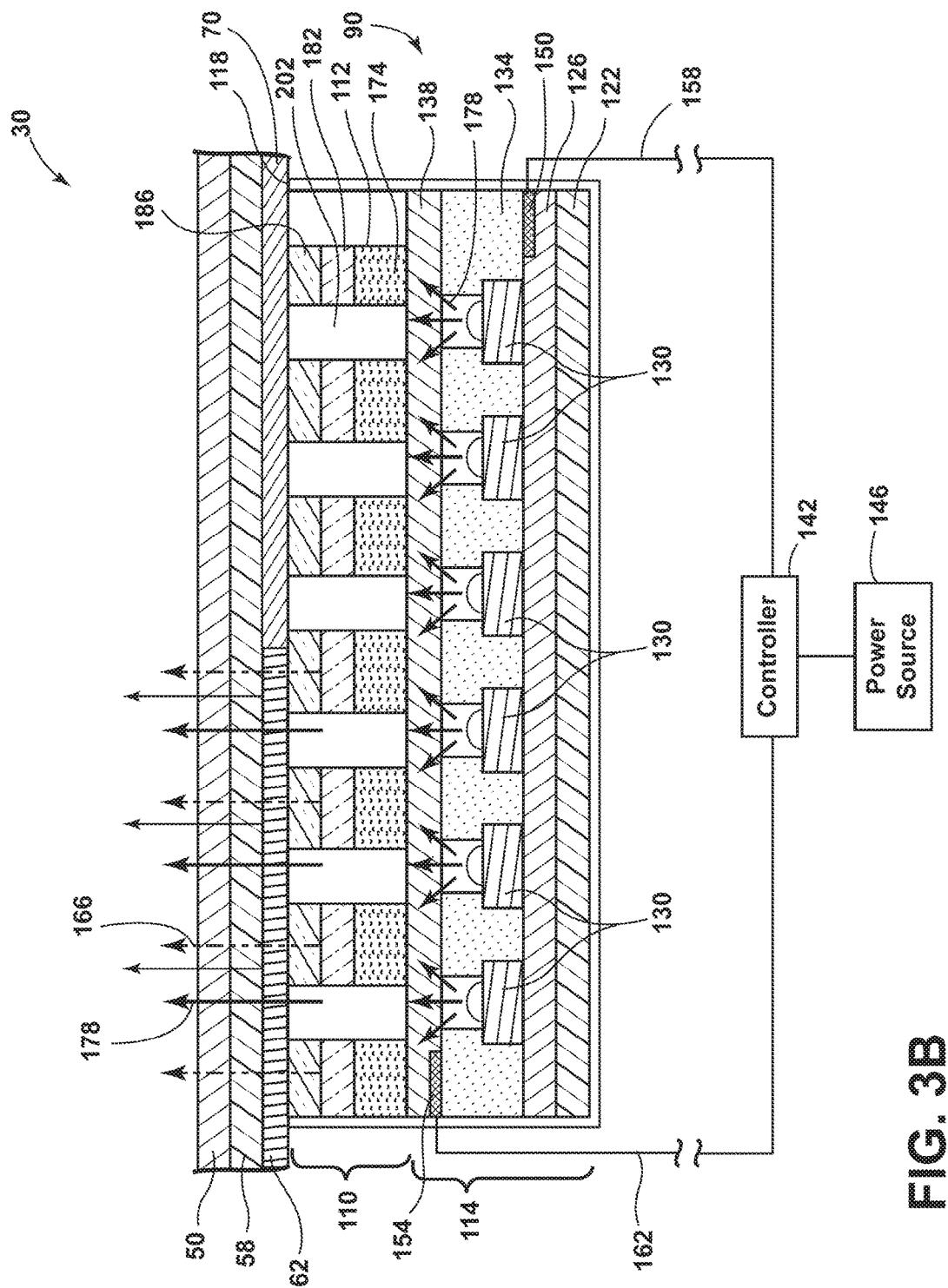
FIG. 3B is an enhanced view of the windscreen taken at line IIIB of FIG. 2B illustrating a light assembly having a luminescent structure separated by light transmissive portions disposed on the light source, according to another embodiment.

Referring to FIGS. 3A and 3B, the light assembly 90 capable of use in the windscreen 30 of FIG. 2B is depicted with an optional photoluminescent structure 110 (FIG. 3B). As illustrated in FIG. 3A, the light assembly 90 may have a stacked arrangement that includes a light-producing assembly 114 and the photoluminescent structure 110. It will be understood that the light assembly 90 may be used without the photoluminescent structure 110 without departing from the teachings provided herein.

The light-producing assembly 114 may correspond to a thin-film or printed light emitting diode (LED) assembly and includes a substrate 122 as its lowermost layer. The substrate 122 may include a polycarbonate, poly-methyl methacrylate (PMMA), or polyethylene terephthalate (PET) material on the order of 0.005 to 0.060 inches thick and is arranged over the intended vehicle substrate on which the light assembly 90 is to be received (e.g., the second substrate 54 or the interlayer 58). Alternatively, as a cost saving measure, the substrate 122 may directly correspond to a preexisting structure (e.g., the second substrate 54 (FIGS. 2A-2C) or the interlayer 58).

The light-producing assembly 114 includes a positive electrode 126 arranged over the substrate 122. The positive electrode 126 includes a conductive epoxy such as, but not limited to, a silver-containing or copper-containing epoxy. The positive electrode 126 is electrically connected to at least a portion of a plurality of LED sources 130 arranged within a semiconductor ink 134 and applied over the positive electrode 126. The LED sources 130 and the semiconductor ink 134 form a sheet. Likewise, a negative electrode 138 is also electrically connected to at least a portion of the LED sources 130. The negative electrode 138 is arranged over the semiconductor ink 134 and includes a transparent or translucent conductive material such as, but not limited to, indium tin oxide. Additionally, each of the positive and negative electrodes 126, 138 are electrically connected to a controller 142 and a power source 146 via a corresponding bus bar 150, 154 and conductive leads 158, 162 (e.g., the transparent conductive leads). The bus bars 150, 154 may be printed along opposite edges of the positive and negative electrodes 126, 138 and the points of connection between the bus bars 150, 154 and the conductive leads 158, 162 may be at opposite corners of each bus bar 150, 154 to promote uniform current distribution along the bus bars 150, 154. It should be appreciated that in alternate embodiments, the orientation of components within the light-producing assembly 114 may be altered without departing from the concepts of the present disclosure. For example, the negative electrode 138 may be disposed below the semiconductor ink 134 and the positive electrode 126 may be arranged over the aforementioned semiconductor ink 134. Likewise, additional components, such as the bus bars 150, 154, may also be placed in any orientation such that the light-producing assembly 114 may emit outputted light 166 (FIG. 3B) towards a desired location.

The LED sources 130 may be dispersed in a random or controlled fashion within the semiconductor ink 134 and may be configured to emit focused or non-focused light toward the phosphorescent layer 62 and/or photoluminescent structure 110 (FIG. 3B). The LED sources 130 may correspond to micro-LEDs of gallium nitride elements on the order of about 5 to about 400 microns in size and the semiconductor ink 134 may include various binders and dielectric material including, but not limited to, one or more of gallium, indium, silicon carbide, phosphorous, and/or translucent polymeric binders.

The semiconductor ink 134 can be applied through various printing processes, including ink jet and silk screen processes, to selected portion(s) of the positive electrode 126. More specifically, it is envisioned that the LED sources 130 are dispersed within the semiconductor ink 134, and shaped and sized such that a substantial quantity of the LED sources 130 align with the positive and negative electrodes 126, 138 during deposition of the semiconductor ink 134. The portion of the LED sources 130 that ultimately are electrically connected to the positive and negative electrodes 126, 138 may be illuminated by a combination of the bus bars 150, 154, controller 142, power source 146, and conductive leads 158, 162. According to one embodiment, the power source 146 may correspond to a vehicular power source 146 operating at 12 to 16 VDC. Additional information regarding the construction of light-producing assemblies 114 is disclosed in U.S. Patent Publication No. 2014/0264396 A1 to Lowenthal et al. entitled "ULTRA-THIN PRINTED LED LAYER REMOVED FROM SUBSTRATE," filed Mar. 12, 2014, the entire disclosure of which is incorporated herein by reference.

An overmold material 118 is disposed around the light-producing assembly 114. The overmold material 118 may protect the light-producing assembly 114 from physical and chemical damage arising from environmental exposure. The overmold material 118 may have viscoelasticity (i.e., having both viscosity and elasticity), a low Young's modulus, and/or a high failure strain compared with other materials, so that the overmold material 118 may protect the light-producing assembly 114 when contact is made thereto. For example, the overmold material 118 may protect the light-producing assembly 114 from the environmental contaminants, such as dirt and water, that may come in contact with the light assembly 90 during manufacturing or use.

The phosphorescent layer 62 is arranged over the light-producing assembly 114. In some embodiments, the phosphorescent layer 62 is molded over the light-producing assembly 114. As explained above, the light emitted by the light-producing assembly 114 may be of a wavelength configured to stimulate the persistent phosphorescent materials into emission. In this manner, phosphorescent layer 62 will be charged by the light-producing assembly 114 whenever the light-producing assembly 114 is active. It will be understood that in some embodiments, the phosphorescent layer 62 may be employed separate and away from the light-producing assembly 114. For example, the phosphorescent layer 62 may be positioned on an opposite side of the interlayer 58 (e.g., the exterior surface 58A of FIG. 2B).

Referring to FIG. 3B, the photoluminescent structure 110 is arranged over the negative electrode 138 as a coating, layer, film or other suitable deposition. With respect to the presently illustrated embodiment, the photoluminescent structure 110 may be arranged as a multi-layered structure including an energy conversion layer 112, optional stability layer 182, and optional protective layer 186, as described above. In this embodiment, the energy conversion layer 112 of the photoluminescent structure 110 includes the single photoluminescent material 174, which is configured to convert inputted light 178 received from LED sources 130 into the outputted light 166 having a wavelength different than that associated with the inputted light 178. More specifically, the photoluminescent material 174 is formulated to have an absorption spectrum that includes the emission wavelength of the inputted light 178 supplied from the LED sources 130. The photoluminescent material 174 is also formulated to have a Stokes shift resulting in the converted visible light 166 having an emission spectrum expressed in a desired color, which may vary per lighting application. The photoluminescent structure 110 is configured to convert inputted light 178 received from LED sources 130 into a visible light 166 having a wavelength different than that associated with the inputted light 178. More specifically, the photoluminescent structure 110 is formulated to have an absorption spectrum that includes the emission wavelength of the inputted light 178 supplied from the LED sources 130. The photoluminescent material 174 is also formulated to have a Stokes shift resulting in the converted visible light 166 having an emission spectrum expressed in a desired color, which may vary per lighting application.

The photoluminescent structure 110 may be applied to a portion of the light-producing assembly 114, for example, in a stripped manner. Between the photoluminescent structures 110 may be light transmissive portions 202 that allow inputted light 178 emitted from the LED sources 130 to pass therethrough at the first wavelength. The light transmissive portions 202 may be an open space, or may be a transparent or translucent material. The inputted light 178 emitted through the light transmissive portions 202 may be directed from the light-producing assembly 114 towards the phosphorescent layer 62 such that the phosphorescent layer 62 may be activated and emit colored light. As such, color mixing of the visible light 166 and the light emitted from the phosphorescent layer 62 may be achieved to provide a unique and attractive viewing experience.

Figure 4A:
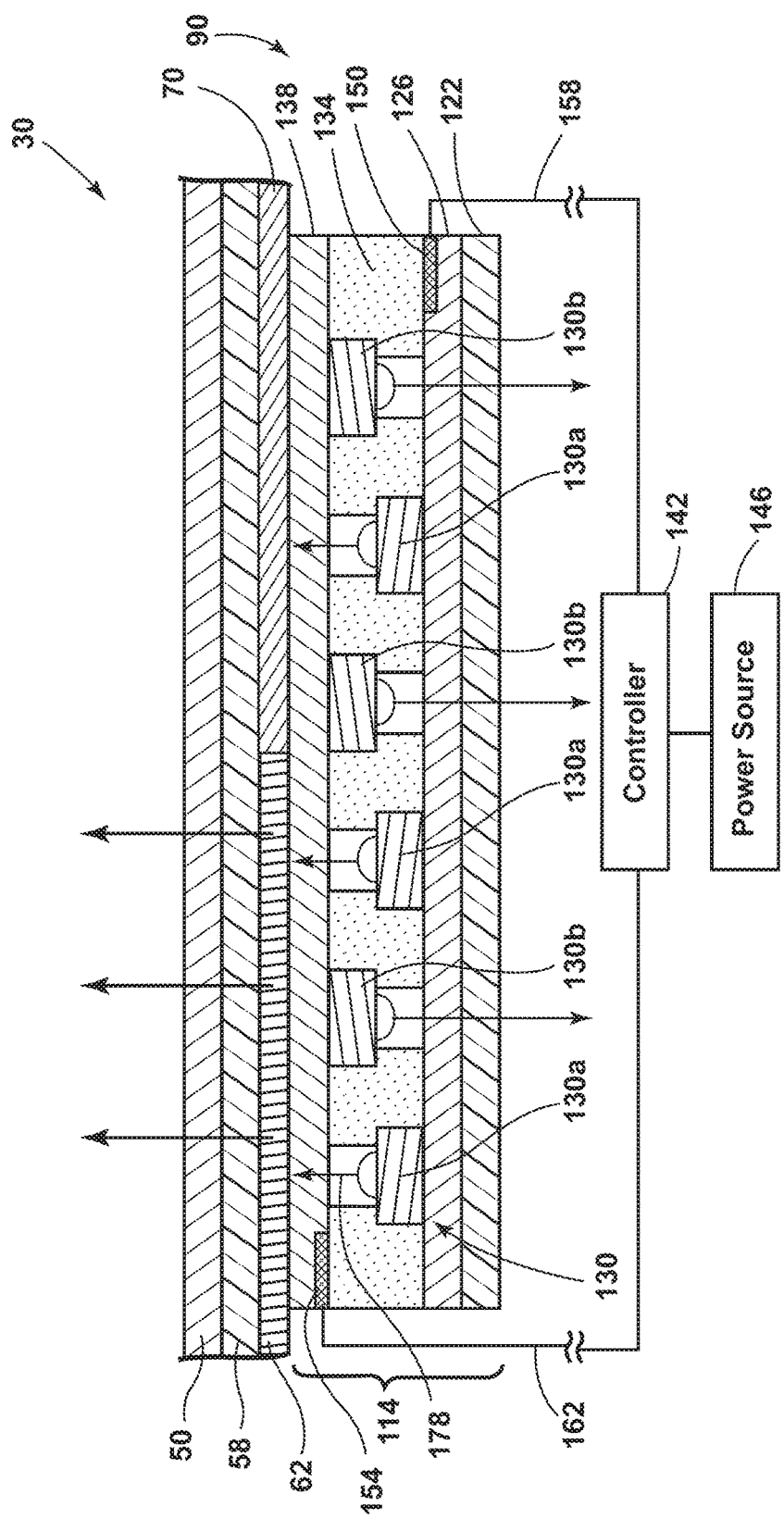
FIG. 4A is an enhanced view of the windscreen taken at line IVA of FIG. 2C.
Figure 4B:
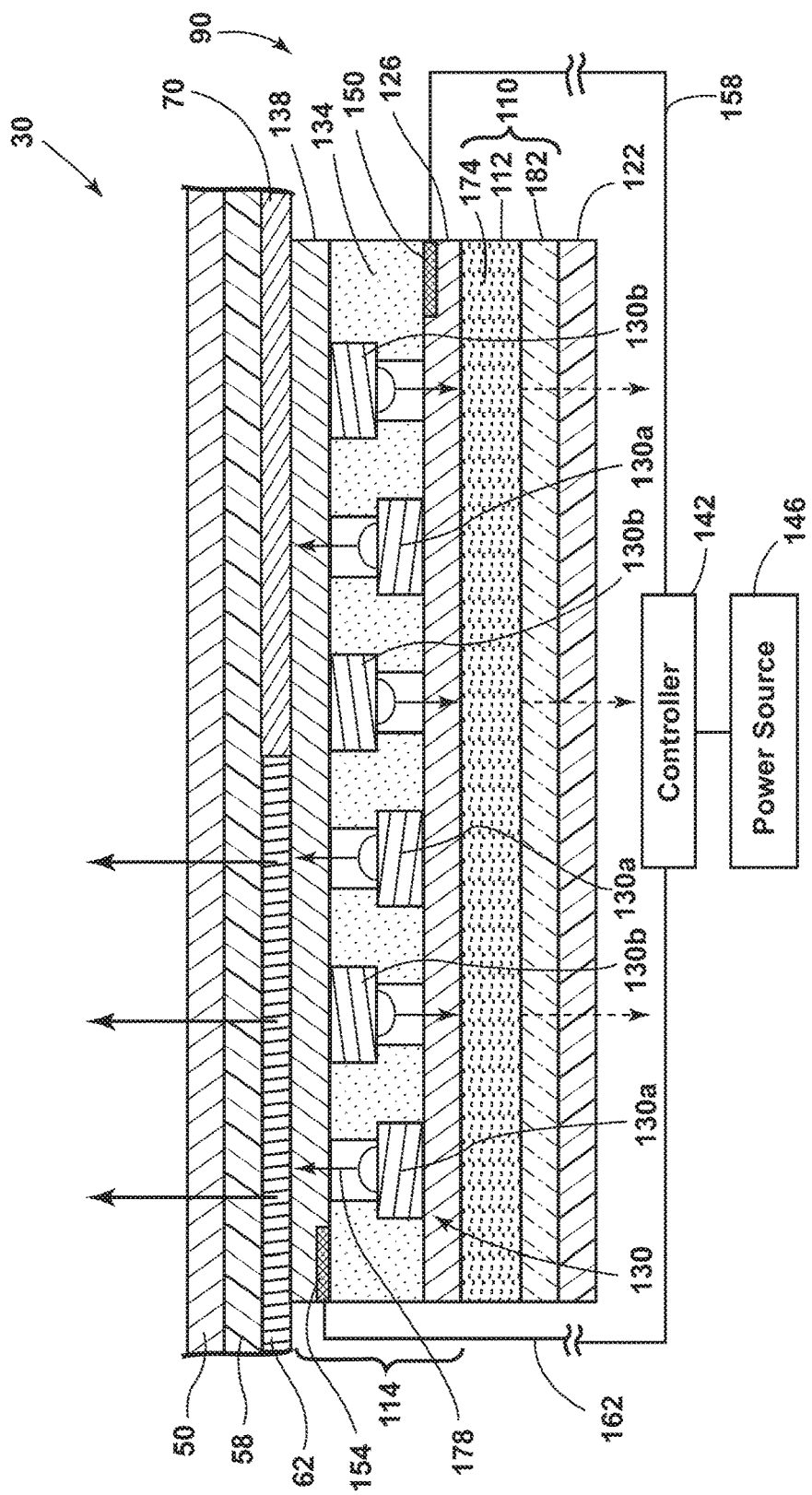
FIG. 4B is an enhanced view of the windscreen taken at line IVB of FIG. 2C.

Referring now to FIGS. 4A and 4B, the light assembly 90 may be configured to emit light toward both the first substrate 50 and the second substrate 54. In such an embodiment, the light assembly 90 may not include the first concealment layer 70. Omission of the first concealment layer 70 allows light emitted from the light assembly 90 toward the second substrate 54 to enter the cabin 18 of the vehicle 10. In such an embodiment, the light assembly 90 may function as a dome light for the cabin 18 (FIG. 1) of the vehicle 10 (FIG. 1). In the depicted embodiment, the plurality of LEDS sources 130 includes a first portion of LEDs 130a biased to direct light in an outward-vehicle direction (e.g., toward the first substrate 50) and a second portion of LEDs 130b biased to direct light in an inward-vehicle direction (e.g., toward the second substrate 54).

In operation, the controller 142 may selectively activate the first and second portion of LEDs 130a, 130b by varying the duty cycle and/or current supplied by the power source 146. In this manner, the controller 142 may activate only the first portion of LEDs 130a, only the second portion of LEDs 130b, or both the first and second portion of LEDs 130a, 130b to effectuate a variety of lighting applications. Additionally, the controller 142 may control the intensity of the first and second portion of LEDs 130a, 130b via direct current control or pulse width modulation to ultimately affect the brightness corresponding to the phosphorescent layer 62 and/or the photoluminescent structure 110 and/or the dome light. For example, with respect to the windscreen 30 (FIG. 1), increasing the intensity of the second portion of LEDs 130b generally results in the photoluminescent structure 110 (FIG. 4B) exhibiting a brighter luminescence. When the light-producing assembly 114 is active, the controller 142 may control the light emission duration of the first and second portion of LEDs 130a, 130b to affect the amount of light emitted toward the phosphorescent layer 62 and the photoluminescent structure 110. For example, the controller 142 may activate the second portion of LEDs 130b relative to the first portion of LEDs 130a such that the photoluminescent structure 110 exhibits sustained luminescence and the phosphorescent layer 62 is kept charged. Alternatively, the controller 142 may flash the first and second portion of LEDs 130a, 130b at varying time intervals such that the corresponding phosphorescent layer 62 remains charged and the photoluminescent structure 110 exhibits a blinking effect. According to various embodiments, the quantity of LED sources 130 in the first and second portion of LEDs 130a, 130b may be different. For example, the second portion of LEDs 130b may be greater than the first portion of LEDs 130a, or vice versa. This may be advantageous in providing a greater luminance to the dome light while allowing sufficient light output by the first portion of LEDs 130a to charge the phosphorescent layer 62.

Figure 5:
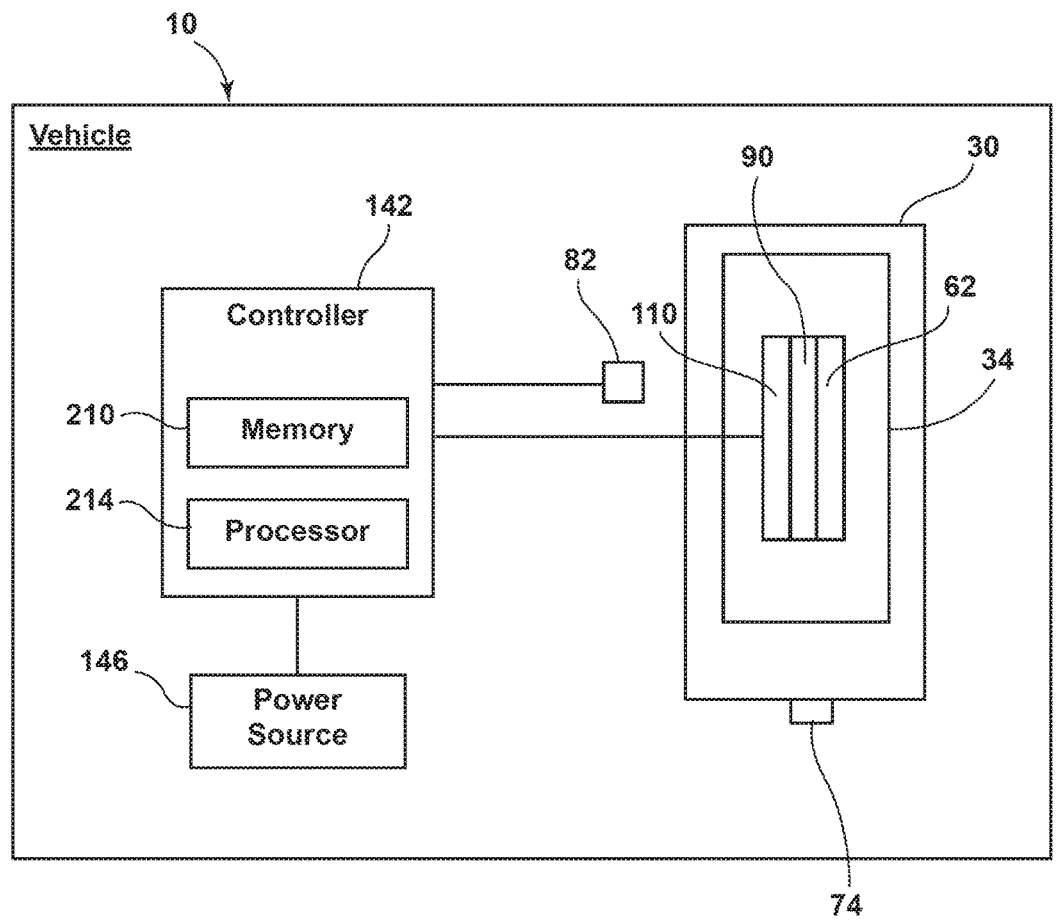
FIG. 5 is a block diagram of the vehicle lighting, according to one embodiment.

Referring now to FIG. 5, a block diagram of the vehicle 10 in which the decoration 34 is positioned within the windscreen 30 is shown. The vehicle 10 includes the controller 142 in communication with the light assembly 90. The controller 142 may include a memory 210 having instructions therein that are executed by a processor 214 of the controller 142. The controller 142 may provide electrical power to the light assembly 90 via the power source 146 located onboard the vehicle 10. In addition, the controller 142 may be configured to control the light output of the light assembly 90 based on feedback received from the light sensor 82 or one or more modules of the vehicle 10. The controller 142 may be configured to operate the LED sources 130 (FIGS. 3A-4B), the first portion of LEDs 130a and/or the second portion of LEDs 130b, separately and/or in an alternating manner (e.g., via current direction manipulation) in order to achieve a specific lighting appearance for the windscreen 30. For example, one or more of the LED sources 130 (e.g., the first portion of LEDs 130a) and/or the light source 74 may be pulsed to activate the phosphorescent layer 62 and another portion of the LED sources (e.g., the second portion of LEDs 130b) may be configured to activate the photoluminescent structure 110. Further, the controller 142 may be configured to pulse the light assembly 90 such that the phosphorescent layer 62 may keep a predetermined level of charge and luminance (e.g., based on feedback from the light sensor 82).

Use of the windscreen illumination present disclosure may offer several advantages. First, use of the light source 74, and/or the first portion of LED sources 130a, may be utilized to maintain a predetermined level of luminance from the phosphorescent layer 62. For example, the light sensor 82 may be used to monitor a level of luminance from the phosphorescent layer 62. When the light sensor 82 determines that the luminance from the phosphorescent layer 62 has dropped below a predetermined level (e.g., at night or in low ambient light situations) the light source 74, and/or the first portion of LED sources 130a, may be pulsed or activated to charge the phosphorescent layer 62. This may be advantageous in ensuring the indicium 38 of the decoration 34 remains visible and aesthetically pleasing. Second, use of the light assembly 90 and/or the photoluminescent structure 110 may allow for the creation of a low profile dome light for the cabin 18 of the vehicle 10.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovation have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims, as set forth below, are incorporated into and constitute part of this Detailed Description.

What is claimed is:

1. A vehicle comprising:
   a body defining a cabin; and
   a glazing coupled to the body comprising:
     a polymeric interlayer positioned between an exterior and an interior glass substrate;
     a phosphorescent layer positioned between the polymeric interlayer and the interior substrate; and
     a printed light assembly positioned between the phosphorescent layer and the interior glass substrate, wherein the printed light assembly is configured to emit light toward both the phosphorescent layer and the interior glass substrate.

2. The vehicle of claim 1, wherein the light assembly is configured to emit light into the polymeric interlayer.

3. The vehicle of claim 2, wherein the polymeric interlayer is configured to guide the light emitted by the light assembly.

4. The vehicle of claim 1, wherein the phosphorescent layer is configured to emit light toward an exterior of the vehicle.

5. The vehicle of claim 1, wherein the glazing is a vehicle windscreen.

6. An automotive glazing, comprising:
   an exterior substantially transparent substrate;
   an interior substantially transparent substrate;
   an interlayer positioned between the exterior and interior substrates;
   a printed light assembly positioned between the interlayer and the interior substrate;
   a first concealment layer positioned between the light assembly and the interior substrate; and
   a phosphorescent layer positioned between the printed light assembly and the interlayer, wherein the phosphorescent layer and the first concealment layer cooperate to define an indicium.

7. The automotive glazing of claim 6, wherein the printed light assembly is a layer extending across a portion of the interlayer.

8. The automotive glazing of claim 6, wherein the printed light assembly extends to an end of the automotive glazing.

9. A vehicle, comprising:
   a body defining a cabin; and
   a windscreen coupled with the body comprising:
     an interlayer extending between an exterior and an interior substantially transparent substrate;
     a phosphorescent layer positioned between the interlayer and the interior substantially transparent layer; and
     a printed light assembly positioned between the interior substantially transparent substrate and the phosphorescent layer, the light assembly configured to emit light into the cabin and exterior to the vehicle.

10. The vehicle of claim 9, wherein the light assembly is configured to pulse light toward the exterior of the vehicle.

11. The vehicle of claim 10, wherein the light assembly is disposed along a top of the windscreen.

12. The vehicle of claim 11, further comprising:
    a concealment layer positioned between the light assembly and the exterior substantially transparent substrate.

* * * * *